United States Patent
Ma et al.

(10) Patent No.: US 11,402,063 B2
(45) Date of Patent: Aug. 2, 2022

(54) WEARABLE DEVICE

(71) Applicants: Beijing BOE Optoelectronics Technology Co., Ltd., Beijing (CN); BOE Technology Group Co., Ltd., Beijing (CN)

(72) Inventors: Zhanshan Ma, Beijing (CN); Wenhong Tian, Beijing (CN); Dong Chen, Beijing (CN); Hao Zhang, Beijing (CN); Lili Chen, Beijing (CN); Zhiyu Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 958 days.

(21) Appl. No.: 16/094,956

(22) PCT Filed: Mar. 29, 2018

(86) PCT No.: PCT/CN2018/081063
§ 371 (c)(1),
(2) Date: Oct. 19, 2018

(87) PCT Pub. No.: WO2018/196545
PCT Pub. Date: Nov. 1, 2018

(65) Prior Publication Data
US 2021/0231259 A1    Jul. 29, 2021

(30) Foreign Application Priority Data

Apr. 27, 2017 (CN) .......................... 201720459233.7

(51) Int. Cl.
| | |
|---|---|
| F16M 13/04 | (2006.01) |
| G06F 1/16 | (2006.01) |
| G02B 27/01 | (2006.01) |

(52) U.S. Cl.
CPC .......... *F16M 13/04* (2013.01); *G02B 27/017* (2013.01); *G06F 1/163* (2013.01)

(58) Field of Classification Search
CPC ........ G02B 27/017; F16M 13/04; G06F 1/163
See application file for complete search history.

(56) References Cited

U.S. PATENT DOCUMENTS

| | | | | |
|---|---|---|---|---|
| 5,954,642 | A * | 9/1999 | Johnson .................. | G06F 3/011 600/300 |
| 2007/0075917 | A1* | 4/2007 | Nishi ...................... | A63F 13/90 345/8 |

(Continued)

FOREIGN PATENT DOCUMENTS

| | | |
|---|---|---|
| CN | 201477289 U | 5/2010 |
| CN | 205750118 U | 11/2016 |

(Continued)

OTHER PUBLICATIONS

International Search Report dated May 30, 2018 in PCT/CN2018/081063.

*Primary Examiner* — Mark Edwards
*Assistant Examiner* — Chayce R Bibbee
(74) *Attorney, Agent, or Firm* — Fay Sharpe LLP

(57) ABSTRACT

A wearable device is provided which includes: a head-mounted display, a C-shaped wearing assembly matching a head contour of a human body, and a connection assembly, the C-shaped wearing assembly being made of a deformable material; wherein an end of the connection assembly is connected to an end of the C-shaped wearing assembly, the other end of the connection assembly is connected to the head-mounted display via a connection shaft, an axial line of (Continued)

the connection shaft passing through a center of gravity of the head-mounted display; wherein the other end of the C-shaped wearing assembly is snapping into the occipital bone of the human body, such that the head-mounted display fits with the face of the human body. The present disclosure may ensure that the head-mounted display in the wearable device is closely attached to the face of the user, thereby preventing light leakage, wearing comfortlessness, and etc.

19 Claims, 4 Drawing Sheets

(56) References Cited

U.S. PATENT DOCUMENTS

| | | | |
|---|---|---|---|
| 2015/0138645 A1* | 5/2015 | Yoo | G02B 27/0149 359/630 |
| 2015/0219901 A1* | 8/2015 | Morimoto | G02B 27/0176 345/8 |
| 2017/0337737 A1* | 11/2017 | Edwards | F16M 13/04 |

FOREIGN PATENT DOCUMENTS

| | | | |
|---|---|---|---|
| CN | 106249416 A | 12/2016 | |
| CN | 206671689 U | 11/2017 | |
| FR | 3037153 A1 | 12/2016 | |

* cited by examiner

WEARABLE DEVICE

This application is a 371 of PCT Patent Application Ser. No. PCT/CN2018/081063, filed on Mar. 29, 2018, which claims priority to Chinese Patent Application No. 201720459233.7, filed on Apr. 27, 2017 and titled "WEARABLE DEVICE", the disclosure of which is hereby incorporated by reference in its entirety.

FIELD OF THE INVENTION

The present disclosure relates to a wearable device.

BACKGROUND OF THE INVENTION

At present, wearable devices, particularly head-wearable devices, for example, bead-mounted display devices and the like, become more and more popular in people's daily life. In practical application, how to securely fix a head-wearable display device to the head of a user has become a research hotspot.

SUMMARY OF THE INVENTION

There is provided a wearable device in the embodiments of the present disclosure. The wearable device comprises:

a head-mounted display, a C-shaped wearing assembly matching a head contour of a human body, and a connection assembly, the C-shaped wearing assembly being made of a first deformable material;

wherein an end of the connection assembly is connected to an end of the C-shaped wearing assembly, and the other end of the connection assembly is connected to the head-mounted display via a connection shaft, and an axial line of the connection shaft passes through a center of gravity of the head-mounted display; and wherein the other end of the C-shaped wearing assembly is capable of snapping into the occipital bone of the human body, to enable the head-mounted display to fit with the face of the human body.

Optionally, the connection assembly comprises a U-shaped structure and two connection shafts, two ends of the U-shaped structure are rotatably connected respectively to the head-mounted display via a connection shaft, and a middle portion of the U-shaped structure is fixedly connected to an end of the C-shaped wearing assembly.

Optionally, the wearable device further comprises a protective sleeve that is sleeved outside the C-shaped wearing assembly and is made of a second deformable material.

Optionally, a shape of the C-shaped wearing assembly matches with a cranial vault contour of the human body, and the wearable device further comprises a protective pad connected to an end, away from the head-mounted display, of the C-shaped wearing assembly, and made of the second deformable material, which is able to fit with the occipital bone of the human body.

Optionally, the protective pad has a thickness of 6 mm to 10 mm.

Optionally, the C-shaped wearing assembly is made of an elastic steel slice.

Optionally, the C-shaped wearing assembly is made of polycarbonate.

Optionally, the second deformable material is at least one of soft rubber, sponge and silica gel.

Optionally, the wearable device further comprises a face fit assembly, wherein the head-mounted display is connected to the face fit assembly, and the face fit assembly is made of the second deformable material.

Optionally, the head-mounted display comprises two inner display screens arranged symmetrically, and image display surfaces of the two inner display screens face towards a user when the wearable device is worn by the user.

Optionally, the head-mounted display further comprises lens arranged on a side where the image display surfaces of the two inner display screens are located.

Optionally, the head-mounted display comprises an external display screen, and an image display surface of the external display screen faces away from a user when the wearable device is worn by the user.

Optionally, the protective pad has a strip shape.

Optionally, the protective pad has round corners.

Optionally, the protective pad has a width gradually increasing from a middle portion to both sides.

Optionally, the face fit assembly and the head-mounted display are detachably connected.

Optionally, the C-shaped wearing assembly has a curvature greater than an average curvature of the head of the human body.

DETAILED DESCRIPTION OF THE EMBODIMENTS

The present disclosure will be described in further detail with reference to the enclosed drawings, to clearly present the principles and advantages of the present disclosure.

With the development of technologies, in particular, the development of the virtual reality technology, head-wearable devices are well prevailing among people. For example, virtual reality (VR) glasses, augmented reality (AR) glasses and the like are all commonly used head-wearable devices. In practical application, how to securely fix a head-mounted display device to the head of a user has become a research hotspot.

In the related art, the head-wearable device may generally include a tightness-adjustable headloop, wherein the headloop may be connected to a head-mounted display of the head-wearable device. During wearing the head-wearable device, the user may fix the headloop on the head, and meanwhile hang the head-mounted display connected to the headloop in front of the face of the user.

However, since different users have different face contours, it is likely that the head-mounted display fails to be closely attached to the faces of different users if the head-mounted display is only hung in front of the faces of the users. In addition, when the user raises or lowers the head, the head-mounted display may probably turn over under the effect of gravity thereof. This also results in that the head-mounted display fails to be attached to the face of the user, and thus causes light leakage and wearing comfortlessness.

Figure 1:
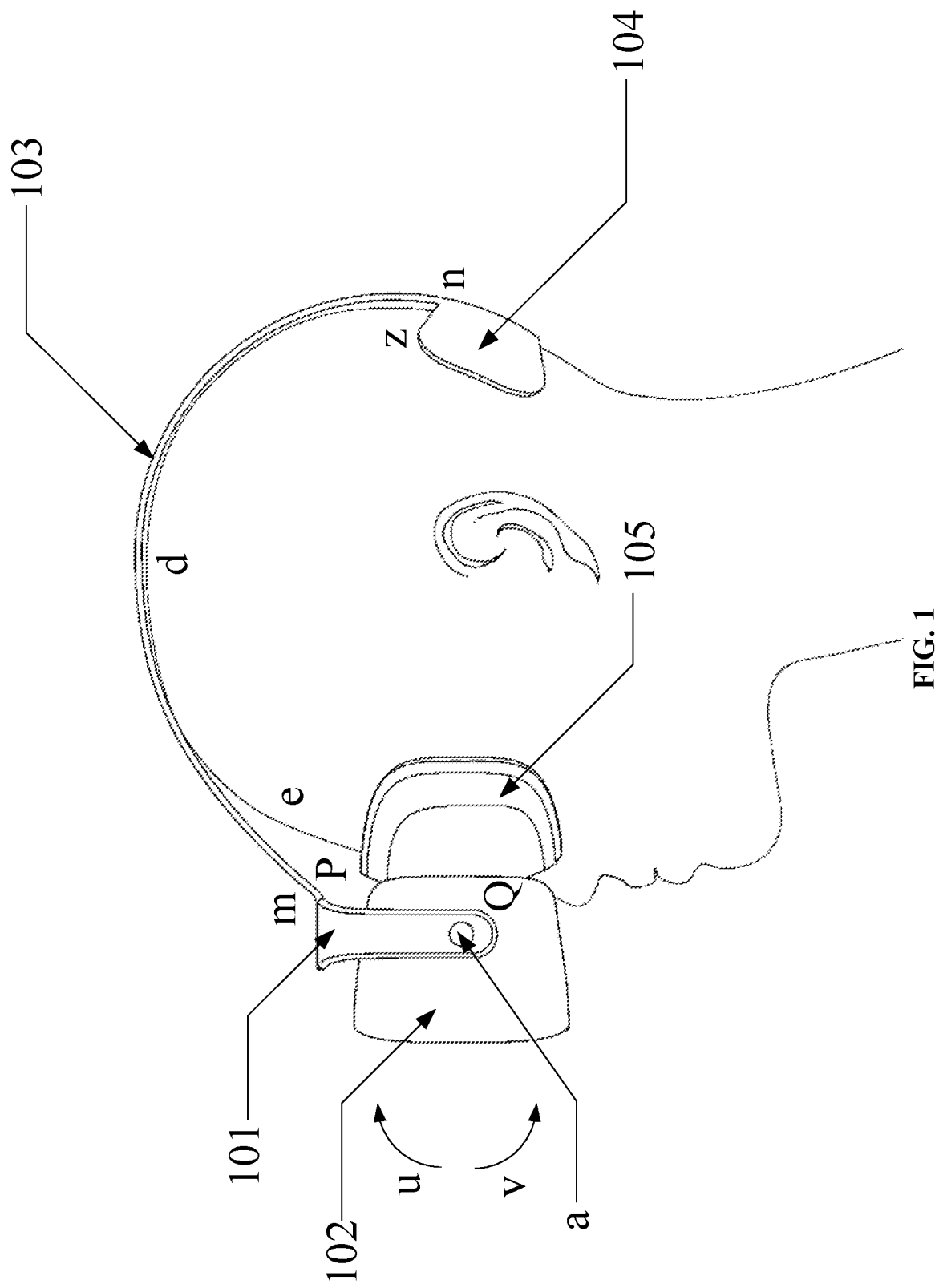
FIG. 1 is a schematic diagram of a structure of a wearable device according to an embodiment of the present disclosure.

An embodiment of the present disclosure provides a wearable device. As illustrated in FIG. 1, the wearable device includes: a connection assembly 101, a head-mounted display 102 and a C-shaped wearing assembly matching a head contour of a human body, wherein the C-shaped wearing assembly 103 is made of a deformable material.

As illustrated in FIG. 1, one end P of the connection assembly 101 is connected to one end m of the C-shaped wearing assembly 103, the other end Q of the connection assembly 101 is connected to the head-mounted display 102 via a connection shaft a, wherein an axial line of the connection shaft a passes through a center of gravity of the head-mounted display 102. The other end n of the C-shaped wearing assembly 103 may be snapped into the occipital bone of the human body, such that the head-mounted display 102 fits with the face of the human body.

It should be noted that the above wearable device may be a pair of virtual reality (VR) glasses, a pair of augmented reality (AR) glasses or the like device that may be worn on the head of the human body. Herein, the head-mounted display 102 may be a component in the wearable device, which is capable of implementing visual and sensory interactions with a user. For example, the head-mounted display 102 may be the glasses body on the VR glasses or AR glasses or the like device.

In an embodiment of the present disclosure, the head-mounted display 102 may include an image display structure configured to display images, for example, a display screen, a lens or the like. Optionally, the head-mounted display 102 may further include a motion sensor (for example, a gyroscope or the like) configured to collect a motion state of the user, and a communication structure, wherein the communication structure may be a Bluetooth module or a wireless fidelity (WiFi) module or the like. In an embodiment of the present disclosure, the head-mounted display 102 may be made of a light material, with a weight of below 300 grams.

As illustrated in FIG. 1, the C-shaped wearing assembly 103 is connected to the head-mounted display 102 via the connection assembly 101. In practical application, the shape of the C-shaped wearable assembly 103 may match a cranial vault contour of the human body. In this case, when the user is wearing the wearable device, the C-shaped wearable assembly 103 may be snapped into the occipital bone z of the user (as illustrated in FIG. 1) via the forehead e, the parietal bone d and the occipital bone z of the user. Herein, it should be noted that the C-shaped wearing assembly 103 is designed with a reference to a simulated head of the human body, wherein the simulated head of the human body is a model that is obtained according to some algorithms.

Of course, in some embodiments of the present disclosure, the C-shaped wearing assembly 103 may also match a cross-section contour of the head of the human body. In this case, when the user is wearing the wearable device, the C-shaped wearing assembly 103 may be snapped into the head of the user via the forehead, the temples and the occipital bone of the user. A middle portion of the C-shaped wearing assembly may be snapped into a gap formed between the ear bone and the skull, wherein the shape of the middle portion is similar to a half of a head band and a head gear.

Optionally, as illustrated in FIG. 1, the above wearable device may further include a protective pad 104, wherein the protective pad 104 is connected to one end n (that is, the other end n of the C-shaped wearing assembly 103 as described above), away from the head-mounted display 102, of the C-shaped wearing assembly 103. The protective pad 104 may be made of a deformable material. Optionally, the protective pad 104 may be made of soft rubber, sponge or silica gel or the like material, and the protective pad 104 may match the occipital bone of the human body. In an embodiment of the present disclosure, the protective pad 104 has a thickness of 6 mm to 10 mm.

By arranging the above protective pad 104, a contact area between the C-shaped wearing assembly 103 and the occipital bone z of the user may be enlarged, such that the pressure between the C-shaped wearing assembly 103 and the occipital bone z of the user is reduced, and thus wearing comfort of the user is ensured. In addition, the protective pad 104 may be made of a deformable material, which further enhances the wearing comfort of the user.

Optionally, the protective pad 104 may have a strip shape, and the protective pad 104 has a width gradually increasing from a middle portion to two sides. In this way, it is ensured that the shape of the protective pad 104 is ergonomic, such that the wearing comfort of the user is improved. In addition, the protective pad 104 may have round corners, which prevent sharp corners from scratching the user, and thus the wearing comfort of the user is improved.

It should be noted that the size of the protective pad 104 may be defined by technicians according to ergonomic data to ensure that the protective pad 104 is not over large to exert a pressure to the ears of the user in one aspect, and not over small to drop during wearing in another aspect.

In practical application, the C-shaped wearing assembly 103 may be made of a deformable material. Optionally, in some embodiments of the present disclosure, the C-shaped wearing assembly 103 may be made of an elastic steel slice, or a polycarbonate or the like.

Figure 2:
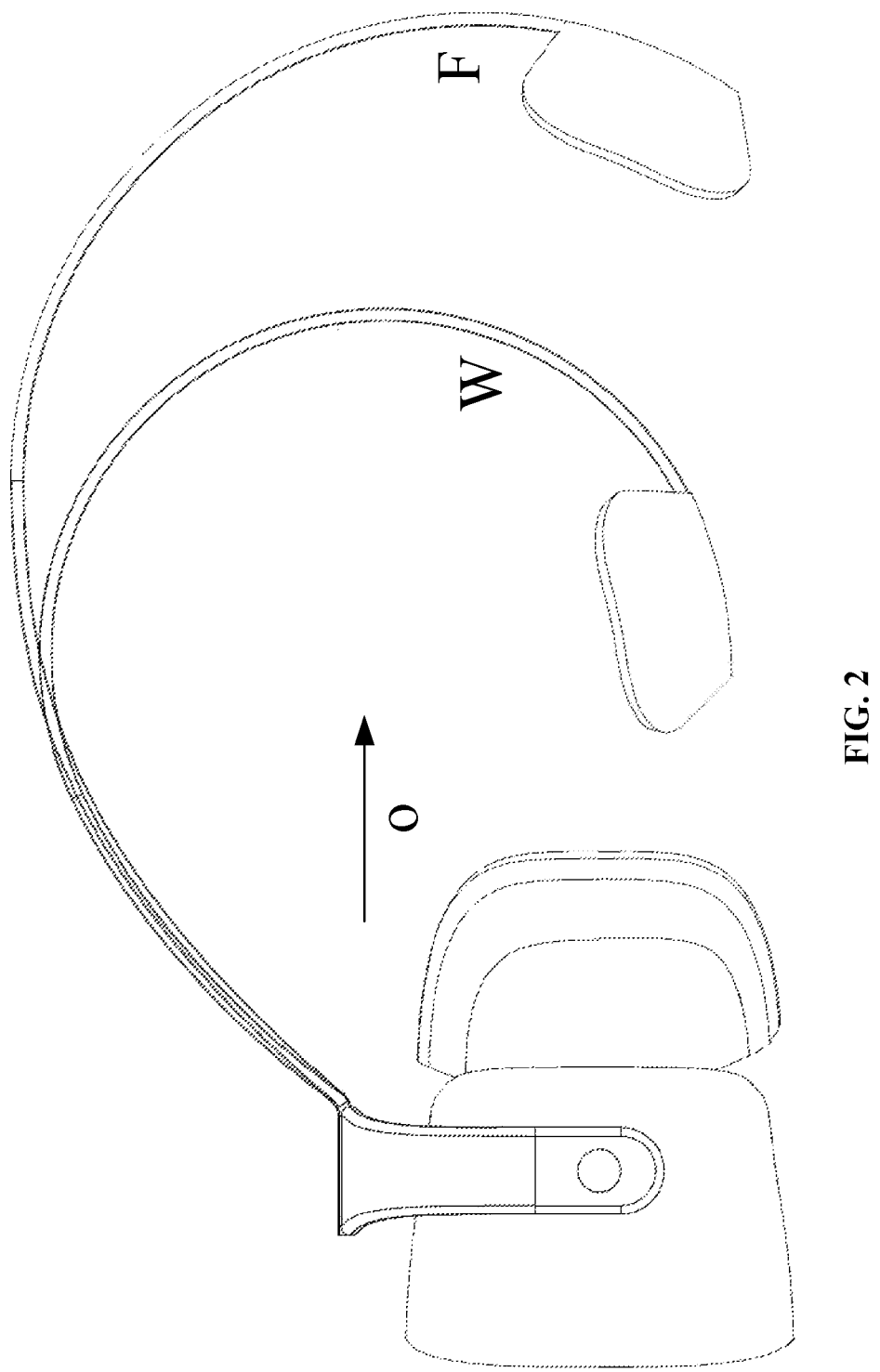
FIG. 2 is a schematic diagram of a structure of a wearable device according to an embodiment of the present disclosure.

In addition, the C-shaped wearing assembly 103 has a curvature greater than an average curvature of the head of the human body, such that it is ensured that when wearing the wearable device, the user pulls the C-shaped wearing assembly 103 towards a direction away from the head-mounted display 102, such that the C-shaped wearing assembly 103 is deformed and then snapped into the head of the user. Referring to FIG. 2 in which W represents the C-shaped wearing assembly 103 in a non-wearing state (that is, a resting state), and F represents the C-shaped wearing assembly 103 in a wearing state. As seen from FIG. 2, the C-shaped wearing assembly 103 may be deformed in the wearing state. Since the C-shaped wearing assembly 103 may be deformed in the wearing state, when the user is wearing the wearable device, one side, facing towards the face of the human body, of the deformed C-shaped wearing assembly 103 forms a tightening force towards a direction of the face of the user (o direction as illustrated in FIG. 2), such that the head-mounted display 102 connected to the C-shaped wearing assembly 103 may be closely attached to the face of the user and fixed thereto under the effect of the tightening force. In this way, light leakage and wearing comfortlessness of the wearable device may be prevented.

It should be noted that the curvature, length, elastic tension and the like physical parameters of the above C-shaped wearing assembly 103 may be defined by technicians according to the ergonomic data, which are not specifically limited in the embodiments of the present disclosure.

Figure 3:
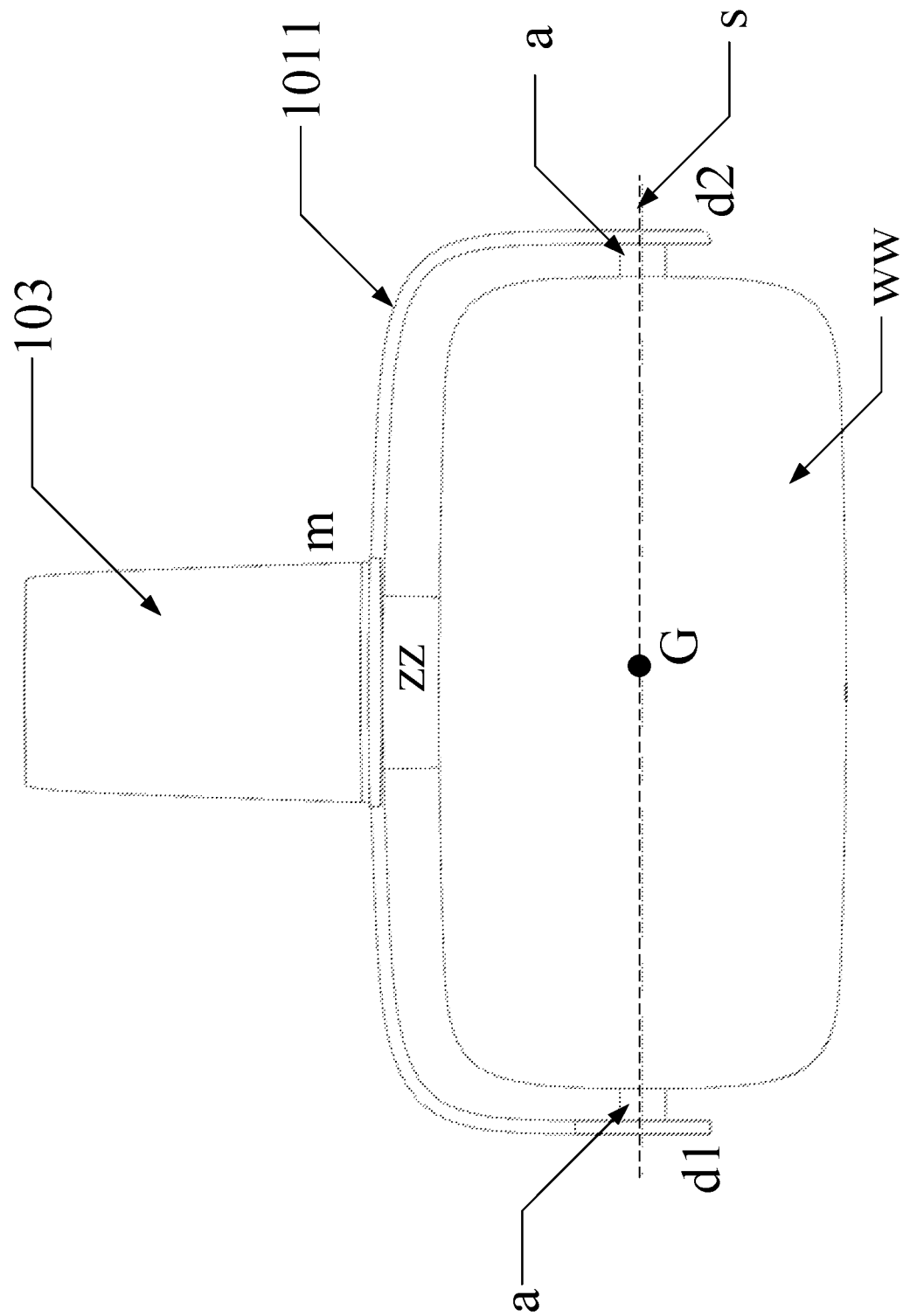
FIG. 3 is a from view of a wearable device according to an embodiment of the present disclosure.

Still referring to FIG. 1, as illustrated in FIG. 1, one end P of the connection assembly 101 is connected to one end m of the C-shaped wearing assembly 103, and the other end Q of the connection assembly 101 is connected to the head-mounted display 102 via the connection shaft a. In addition, referring to FIG. 3, FIG. 3 is a front view of the wearable device. As illustrated in FIG. 3, an axial line s of the connection shaft a passes through the center of gravity G of the head-mounted display 102.

Since one end Q of the connection assembly 101 is connected to the head-mounted display 102 via the connection shaft a, during wearing the wearable device, the head-mounted display 102 may automatically rotate against the axial line of the connection shaft according to the face contour of the user. For example, if the nose bridge and zygoma of the user are high, the head-mounted display 102 may rotate towards a u direction as illustrated in FIG. 1; and if the nose bridge and zygoma of the user are low, the head-mounted display 102 may rotate towards a v direction as illustrated in FIG. 1. The automatic rotation of the head-mounted display 102 according to the face contour of the user in one aspect may ensure that the head-mounted display 102 is closely attached to the face of the user, such that light leakage and wearing comfortlessness of the wearable device may be prevented. In another aspect, when during wearing by the user, the user does not need to manually adjust the position of the head-mounted display 102, such that the wearing steps of the user are simplified.

In addition, since the axial line s of the connection shaft a passes through the center of gravity G of the head-mounted display 102, the gravity of the head-mounted display 102 generates a constant torque of 0 on the axial line s. In this way, when the user raises or lowers his or her head, the head-mounted display 102 may not turn over due to the gravity thereof, such that it is ensured that the head-mounted display 102 is closely attached to the face of the user, and light leakage and wearing comfortlessness of the wearable device are prevented. In addition, since the axial line s of the connection shaft a passes through the center of gravity G of the head-mounted display 102, the tightening force generated when the above C-shaped wearing assembly 103 is deformed may be uniformly distributed in the region where the head-mounted display 102 is in contact with the face of the user. This ensures that the head-mounted display 102 may be closely attached to the face of the user, and prevents light leakage and wearing comfortlessness of the wearable device.

Still referring to FIG. 3, as illustrated in FIG. 3, optionally, the above connection assembly 101 includes a U-shaped structure 1011 and two connection shafts a, wherein two ends d1 and d2 of the U-shaped structure 1011 are respectively rotatably connected to the head-mounted display 102 via one connection shaft a, and a middle portion zz of the U-shaped structure 1011 is fixedly connected to one end m of the C-shaped wearing assembly 103. It should be noted that the U-shaped structure may be made of a rigid material. It should be further noted that when the user is wearing the wearable device, the U-shaped structure has an inverted U-shape relative to the face of the user.

In summary, the wearable device according to the embodiments of the present disclosure includes the C-shaped wearing assembly; when the user is wearing the wearable device, the C-shaped wearing assembly may be snapped into the head of the user; since the C-shaped wearing assembly may be made of the deformable material, during wearing of the wearable device, the C-shaped wearing assembly may generate a tightening force towards the face of the user; under the tightening force, the head-mounted display may be closely attached to the face of the user; in addition, since the axial line of the connection shaft connected to the head-mounted display passes through the center of gravity of the head-mounted display, the torque generated by the gravity of the head-mounted display on the axial line is constantly equal to 0; in this way, when the user raises or lowers his or her head, the head-mounted display may not turn over due to the gravity thereof, such that it is ensured that the head-mounted display is closely attached to the face of the user. The closely attachment of the head-mounted display to the face of the user may prevent light leakage and wearing comfortlessness of the wearable device.

Optionally, in practical application, the above wearable device may further include a protective sleeve, wherein the protective sleeve is sleeved outside the C-shaped wearing device 103, and the protective sleeve is made of the deformable material. In an embodiment of the present disclosure, the deformable material may be soft rubber, sponge, silica gel or the like.

The protective sleeve arranged outside the C-shaped wearing assembly 103 may prevent the C-shaped wearing assembly 103 from hard contact with the head of the user, such that wearing comfort of the user can be ensured.

Still referring to FIG. 1, the above wearable device may further include a face fit assembly 105, wherein the head-mounted display 102 is connected to the face fit assembly 105, and the face fit assembly 105 is made of a deformable material such as sponge or the like.

In practical application, when the user is wearing the wearable device, the head-mounted display 102 needs to be in contact with the face of the user for a long time. Therefore, in order to ensure the wearing comfort, the embodiments of the present disclosure may provide the face fit assembly 105. The face fit assembly 105 may be positioned between the head-mounted display 102 and the face of the user when the user is wearing the wearable device, and may be in contact with the face of the user. Since the face fit assembly 105 is made of the deformable material, the face fit assembly 105 exerts a small pressure to the face of the user when being in contact with the face of the user. In this way, wearing comfort of the wearable device can be ensured.

Optionally, the face fit assembly 105 may be detachably connected to the head-mounted display 102. In this way, it is convenient to replace and clean the face fit assembly 105.

In practical application, the head-mounted display 102 may include two inner display screens that are symmetrically arranged, wherein when the user is wearing the wearable device, image display surfaces of the two inner display screen face towards the user. It should be noted that the image display surfaces of the above two display screens are light-emitting surfaces of the two display screens.

Figure 4:
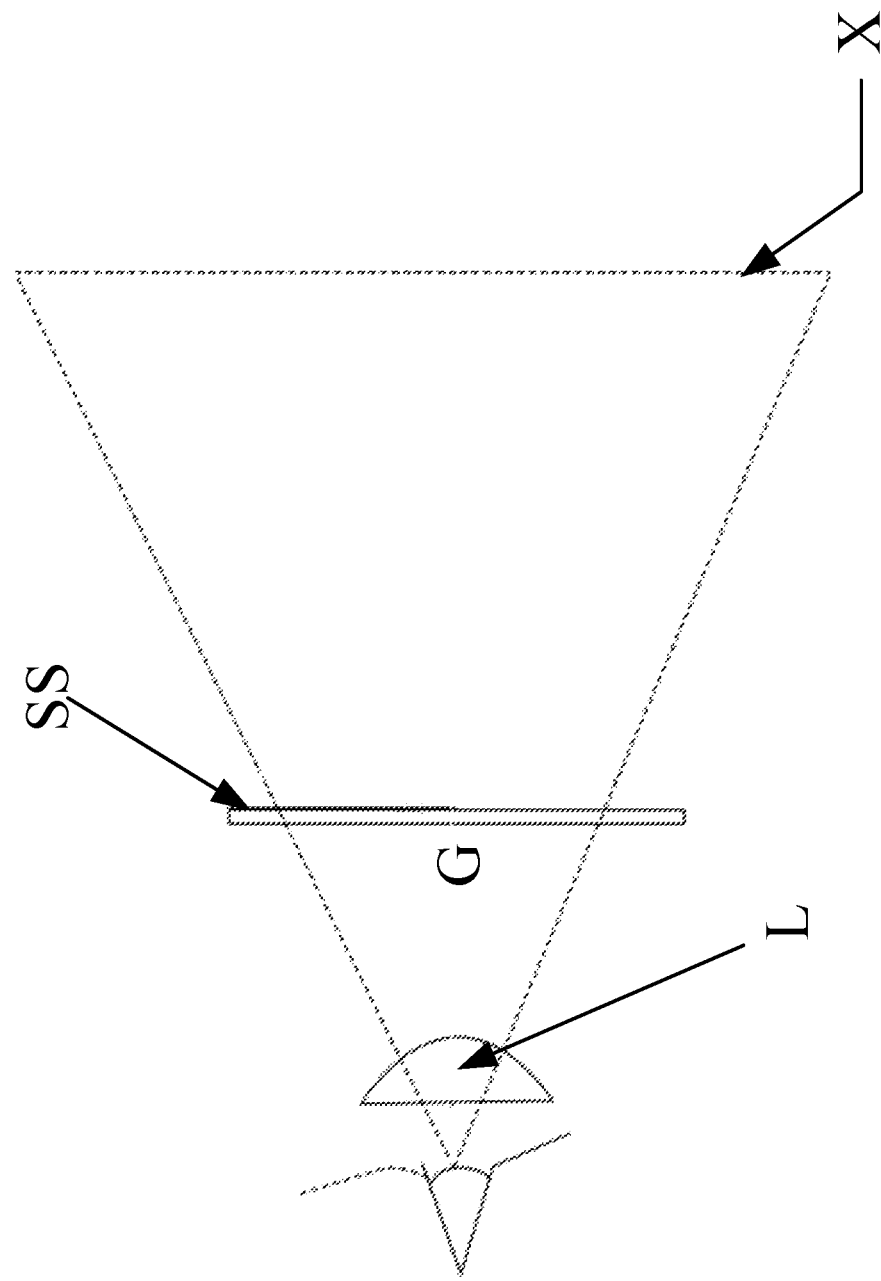
FIG. 4 is a schematic diagram of a structure of a head-mounted display according to an embodiment of the present disclosure.

The head-mounted display 102 may further include a lens, wherein the lens may be arranged on the sides where the image display surfaces of the two inner display screens are located. As illustrated in FIG. 4, the image display surface of the inner display screen SS is G, and the lens L may be arranged on the side where the image display surface G of the inner display screen SS is located. Optionally, the head-mounted display 102 may include two lenses, wherein the two lenses may be respectively arranged on the sides where the image display surfaces of the two inner display screens are located. When the user is wearing the wearable device, the lenses are located between the inner display screens and the user. In actual implementation, the lens may be a convex lens, and the image displayed on the inner display screen may generate an enlarged virtual image under the action of the convex lens, such that the user is capable of clearly watching the image displayed on the inner display screen. As illustrated in FIG. 4, the image displayed on the inner display screen SS may form an enlarged virtual image X through the convex lens.

Optionally, the head-mounted display 102 may include an external display screen. Referring to FIG. 3, the external display screen may be arranged on a ww side of the head-mounted display 102, wherein when the user is wearing the wearable device, an image display surface of the external display screen faces away from the user. In practical application, the external display screen may display face images of the user who is wearing the wearable device. In this case, the head-mounted display 102 may further include an image acquisition component (for example, a video camera or the like), wherein the image collection component may collect images of the face of the user who is wearing the wearable device. Alternatively, the external display screen may display the images or the like displayed on the inner display screen, which is not specifically limited in the embodiments of the present disclosure.

The wearable device according to the embodiments of the present disclosure may be worn on the head of the user. Hereinafter, in the embodiments of the present disclosure, a wearing method of the wearable device is briefly described. The method may include:

extending the C-shaped wearing assembly of the wearable device such that an opening of the C-shaped wearing assembly is greater than a head circumference in a longitudinal section of the head of the user; and then snapping the C-shaped wearing assembly into the head of the user, and positioning the head-mounted display connected to the C-shaped wearing assembly in front of the face of the user.

The foregoing descriptions are only exemplary embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A wearable device, comprising:
a head-mounted display, a C-shaped wearing assembly matching a head contour of a human body, and a connection assembly, the C-shaped wearing assembly being made of a first deformable material;
wherein an end of the connection assembly is connected to an end of the C-shaped wearing assembly, and the other end of the connection assembly is connected to the head-mounted display via a connection shaft, and an axial line of the connection shaft passes through a center of gravity of the head-mounted display; and
wherein the other end of the C-shaped wearing assembly is capable of snapping into the occipital bone of the human body, to enable the head-mounted display to fit with the face of the human body,
wherein the connection assembly comprises a U-shaped structure and two connection shafts, each end of the U-shaped structure is connected to the head-mounted display via a connection shaft respectively, the two connection shafts are cylindrical such that the U-shaped structure is rotatable relative to the head-mounted display;
wherein a middle portion of the U-shaped structure is fixedly connected to an end of the C-shaped wearing assembly;
wherein at least a portion of the head-mounted display is located on an inner side of the U-shaped structure, such that the U-shaped structure surrounds the at least a portion of the head-mounted display outside the head-mounted display, with a gap present between an inner surface of the U-shaped structure and the head-mounted display.

2. The wearable device according to claim 1, further comprising a protective sleeve that is sleeved outside the C-shaped wearing assembly and is made of a second deformable material.

3. The wearable device according to claim 1, wherein a shape of the C-shaped wearing assembly matches with a cranial vault contour of the human body, and the wearable device further comprises a protective pad connected to an end, away from the head-mounted display, of the C-shaped wearing assembly, and made of the second deformable material, which is able to fit with the occipital bone of the human body.

4. The wearable device according to claim 3, wherein the protective pad has a thickness of 6 mm to 10 mm.

5. The wearable device according to claim 1, wherein the C-shaped wearing assembly is made of an elastic steel slice.

6. The wearable device according to claim 1, wherein the C-shaped wearing assembly is made of polycarbonate.

7. The wearable device according to claim 2, wherein the second deformable material is at least one of soft rubber, sponge and silica gel.

8. The wearable device according to claim 1, further comprising a face fit assembly, wherein the head-mounted display is connected to the face fit assembly, and the face fit assembly is made of the second deformable material.

9. The wearable device according to claim 1, wherein the head-mounted display comprises two symmetrical inner display screens, and image display surfaces of the two inner display screens face towards a user when the wearable device is worn by the user.

10. The wearable device according to claim 9, wherein the head-mounted display further comprises lens on a side where the image display surfaces of the two inner display screens are located.

11. The wearable device according to claim 1, wherein the head-mounted display comprises an external display screen, and an image display surface of the external display screen faces away from a user when the wearable device is worn by the user.

12. The wearable device according to claim 3, wherein the protective pad has a strip shape.

13. The wearable device according to claim 3, wherein the protective pad has round corners.

14. The wearable device according to claim 12, wherein the protective pad has a width gradually increasing from a middle portion to both sides.

15. The wearable device according to claim 8, wherein the face fit assembly and the head-mounted display are detachably connected.

16. The wearable device according to claim 1, wherein when the C-shaped wearing assembly is in a non-wearing state, the C-shaped wearing assembly has a curvature greater than an average curvature of the head of the human body; and when the C-shaped wearing assembly is in a wearing state, the C-shaped wearing assembly is deformed to form a tightening force towards a direction of the face of the human body.

17. The wearable device according to claim 3, wherein the second deformable material is at least one of soft rubber, sponge or silica gel.

18. The wearable device according to claim 9, wherein the head-mounted display comprises an external display screen, and an image display surface of the external display screen faces away from a user when the wearable device is worn by the user.

19. The wearable device according to claim 1, wherein the wearable device further comprises a protective pad connected to an end, away from the head-mounted display, of the C-shaped wearing assembly, and made of the second deformable material;

the first deformable material is an elastic steel slice or polycarbonate; and the second deformable material is at least one of soft rubber, sponge and silica gel.

* * * * *